United States Patent Office 2,870,216
Patented Jan. 20, 1959

2,870,216

DISPROPORTIONATION OF ORGANIC SULFOXIDES

David P. Sorensen, Bloomfield, and Horace R. Davis, Cedar Grove, N. J., assignors to The M. W. Kellogg Company, Jersey City, N. J., a corporation of Delaware No Drawing. Application December 12, 1956
Serial No. 627,746

19 Claims. (Cl. 260—607)

This invention relates to the production of organic sulfones by catalytic disproportionation of organic sulfoxides using osmium tetroxide as a catalyst in the presence of an inorganic oxide of nitrogen.

Organic sulfones are useful as solvents for various chemical compounds such as polyacrylonitrile and the like, and are particularly useful as extraction solvents for the separation of aromatic hydrocarbons from aliphatic hydrocarbons. Owing to their unusual thermal stability, the sulfones are also useful as heat transfer agents, and although unaffected by aqueous acids and aqueous alkalies, with certain reagents the sulfones act as chemical intermediates in the preparation of metal complexes which are useful in electroplating, azo dyes and the like. Certain sulfones such as sulfonal, tetronal, and the like are useful medicinally as hypnotics, and aryl sulfones have been found to be useful as paper impregnators in capacitors.

The sulfoxides which are employed in the process of this invention are disclosed in copending application Serial No. 566,762, filed February 21, 1956, on the catalytic disproportionation using osmium tetroxide as a catalyst, of an organic sulfoxide containing the sulfur atom of the sulfoxide group singly bonded to two organic radicals. The following formula illustrates one type of organic sulfoxide included in this group:

(1)

in which $n$ is an integer from 1 to 100 or more and R and R′ may be identical or different organic radicals such as saturated hydrocarbon alkyl radicals of the homologous series, methyl, ethyl, propyl, butyl, cetyl, eicosyl, heptacontyl, and the like, and isomers thereof; mono- and polyolefinic hydrocarbon radicals derived from the homologous series of unsaturated compounds ethylene, propylene, butylene, and the like, and propadiene, butadiene, and the like, and isomers thereof; saturated hydrocarbon cyclic radicals derived from cyclobutane, cyclopentane, cyclohexane, and the like, and isomers thereof; unsaturated hydrocarbon cyclic radicals derived from cyclobutene, cyclohexene, cyclooctatetrene, cyclohexadiene, cyclopentadiene, and the like, and isomers thereof; saturated and unsaturated heterocyclic radicals derived from quinone, pyrrolidine, thiophene, indole, carbazole, pyridine, acridine, and the like, and isomers thereof; and aromatic radicals derived from benzene, naphthalene, anthracene, and the like, including alkyl, alkenyl and halogen substituted aromatic radicals such as those derived from styrene, ethyl benzene, trichloromethyl benzene, toluene, xylene, diethyl benzene, and the like.

The carbon atoms of the organic sulfoxides may be partially or totally substituted with any of the halogens; alkyl radicals derived from the homologous series ethane, propane, butane, and the like, and isomers thereof; olefinic radicals derived from the homologous series ethylene, propylene, butylene, and the like, and isomers thereof; diolefinic radicals derived from butadiene, and the like, and isomers thereof; and/or with functional groups such as C=O, $NO_2$, COOH, COOR, SO, and the like.

Other organic sulfoxides which may be disproportionated in accordance with the invention include organic polysulfoxides in which the sulfoxide groups are separated by at least one carbon atom, the following formula being exemplary of this type of polysulfoxide

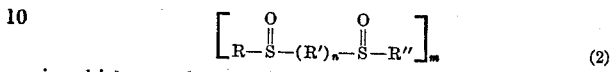
(2)

in which $n$ and $m$ are integers from 1 to 100 or more, $n$ preferably being an integer between 1 and about 10 and $m$ preferably being an integer between 1 and 20. R, R′, and R″ are identical or different radicals and may be any of those listed for R and R′ above. Examples of these polysulfoxides are methylene bis-(methylsulfoxide), 2,2-bis(ethylsufoxy) butane, 3,3-bis(ethylsulfoxy) pentane, 2,2-bis(ethylsulfoxy) propane, etc.

Heterocyclic organic sulfoxides may also be disproportionated to sulfones using osmium tetroxide as a catalyst, exemplary of sulfoxides of this type being tetramethylene sulfoxide, thioxane sulfoxide, and the like.

The preferred organic sulfoxides which are disproportionated in accordance with this invention are the hydrocarbon sulfoxides having between 2 and 50 carbon atoms in the molecule and most preferably aliphatic hydrocarbon sulfoxides wherein the aliphatic substituents on the sulfur atom each contain between 1 and 10 carbon atoms. Some specific examples of these preferred types of sulfoxides are dimethyl sulfoxide, diethyl sulfoxide, methyl butyl sulfoxide, ethyl propyl sulfoxide, methyl ethyl sulfoxide, diphenyl sulfoxide, methyl phenyl sulfoxide, methyl octyl sulfoxide, methylene bis-(methylsulfoxide), 2,2 - bis(ethylsulfoxy)butane, 2,2 - bis(ethylsulfoxy)propane, 3,3-bis(ethylsulfoxy)pentane, etc. Although higher molecular weight sulfoxides are disproportionated just as readily, applications of the resulting sulfones are not as numerous as are those of the lower molecular weight sulfones. At least one of the products of the disproportionation reaction is a sulfone regardless of the type of sulfoxide used, i. e., mono- or polysulfoxides of the aromatic, aliphatic, cyclic or heterocyclic type.

In accordance with the present invention, the foregoing organic sulfoxides are disproportionated in the presence of osmium tetroxide as a catalyst and an oxide of nitrogen compound. The oxide of nitrogen may be added per se or it may be derived from an oxide of nitrogen-liberating compound such as, for example, nitric acid and nitrous acid.

Examples of oxides of nitrogen which are suitably used in the process of this invention are nitric oxide (NO), nitrogen dioxide ($NO_2$), nitrogen pentoxide, ($N_2O_5$), nitrogen tetroxide ($N_2O_4$), and nitrogen trioxide ($N_2O_3$). The oxide of nitrogen may be added in an undiluted state or in solution, for example, an aqueous solution. The preferred oxide of nitrogen compounds which are used in accordance with the present invention are nitrogen dioxide and nitric oxide, and since nitric acid is a convenient source of nitrogen dioxide and nitric oxide, it is also preferred. For the purposes of the present invention, nitric acid will be included under the group referred to herein as oxide of nitrogen compounds.

The osmium tetroxide catalyst may be generated in situ by the addition of osmium metal, or any compound of osmium, and an oxide of nitrogen compound to the reaction mixture.

In the process of the copending application, Serial No. 566,762, the osmium tetroxide catalyst is gradually reduced to a lower oxidation state in which form it is no longer a catalyst for the disproportionation reaction, and it is then necessary to remove the reduced catalyst by filtration or by distillation of the volatile organic materials, i. e., sulfides and sulfones, and then recover the reduced catalyst from the distillation residue. More often, it is desirable to convert all of the sulfoxide reactant to sulfone, and in the process of the copending application, supra, generally only half of the starting material is so converted. By the process of the present invention, it is possible to obtain complete conversion of the sulfoxide to sulfone.

In the process of this invention, it has been found that the addition of an oxide of nitrogen, or an oxide of nitrogen-liberating compound such as nitric acid, to the reaction mixture results in higher yields of the product and prevents the reduction of osmium tetroxide during the disproportionation reaction. This result is unexpected since it is known that osmium metal is unaffected by dilute nitric acid or the oxides of nitrogen.

It has also been found that the addition of oxygen, or an oxygen-containing gas such as air, to the reaction mixture containing organic sulfoxide, osmium tetroxide, and an oxide of nitrogen or an oxide of nitrogen-liberating compound, either by bubbling the oxygen or air into the reaction mixture or by pressuring the oxygen or air into a closed vessel under superatmospheric pressure, permits complete oxidation of sulfoxide to sulfone thereby substantially eliminating the formation of sulfide products as formed by the process of the copending application, supra. Yields approaching complete conversion of the sulfoxide to the sulfone may also be accomplished by employing a sufficient excess of the oxide of nitrogen compound without the aid of oxygen, i. e. by employing preferably a weight ratio of oxide of nitrogen to sulfoxide not in excess of 10 to 1. When oxygen is employed to aid in the oxidation of sulfoxide and to prevent the rapid depletion of the oxide of nitrogen compound, it is used in a weight ratio of at least 0.2 to 1 oxygen to organic sulfoxide.

The disproportionation reaction may proceed by intermolecular or intermolecular disproportionation, and the reaction may be conducted in either an aqueous or a non-aqueous system. When an aqueous system is used, the rate and heat of reaction are more easily controlled. However, it is generally necessary to use a larger amount of osmium tetroxide catalyst in the dilute solution.

The non-aqueous reaction system may be used in the absence of a diluent, or if a diluent is desired, it must be of a type which will not reduce the catalyst. For example, alcohols and aldehydes are not suitable, but exemplary of useful solvents are chloroform, benzene, nitrobenzene, toluene, xylene, acetic acid, and cyclohexane.

The weight ratio of osmium tetroxide to organic sulfoxide in an aqueous disproportionation reaction according to this invention varies between about $1 \times 10^{-7}$ to 1 and about $1 \times 10^{-4}$ to 1, preferably between $1 \times 10^{-5}$ to 1 and about $1 \times 10^{-4}$ to 1; whereas in a non-aqueous disproportionation reaction the weight ratio varies between $1 \times 10^{-8}$ to 1 and about $1 \times 10^{-4}$ to 1, preferably between about $1 \times 10^{-6}$ to 1 and $1 \times 10^{-4}$ to 1. Larger quantities of catalyst may be used, if desired, but such larger amounts produce no process advantage and represent an unnecessary operational expense.

In an aqueous system the amount of water used is limited only by practical considerations of separation and isolation of the product and, in an aqueous system, the reaction is effected at a temperature in the range of about 65° C. to about 180° C., preferably at about 100° C. or slightly higher. The reaction rate is low at temperatures of about 70° C. and the most desirable reaction temperature is 100 C. or slightly higher with the upper limit of temperature being determined only by the thermal stability of the reactants, the intermediates, and the products of the reaction. The reaction time is in the range of about a few minutes to 24 hours, although longer reaction times may be used, if desired.

In the non-aqueous system the reaction temperature may be in the range of about 20° C. to 200° C., preferably about 50° C. to 120° C., and the reaction time is in the range of a few minutes to 24 hours, although longer reaction times may be used, if desired.

The oxide of nitrogen compound may be conveniently added in the form of nitric acid and the weight ratio of 6 N nitric acid to organic sulfoxide which is used is in the range of from about 1 to 1000 to about 10 to 1. Higher weight ratios of nitric acid may be used but such ratios do not offer any particular process advantage. When oxide of nitrogen is added per se the weight ratio of oxide of nitrogen to organic sulfoxide is the same, that is, in the range of 1 to 1000 to 10 to 1.

In a preferred embodiment of the present invention, particularly when the total conversion of sulfoxide is sulfone is desired, oxygen is employed in the reaction. When oxygen or air is bubbled through the reaction mixture or pressured into a closed vessel containing the reaction mixture, the weight ratio of oxygen to organic sulfoxide is in the range of between about 0.2 to 1 and about 1 to 1. The weight ratio of oxygen to sulfoxide to oxide of nitrogen compound is most preferably between about 0.5 to 1 to 0.5 and about 1 to 1 to 0.01.

The disproportionation reaction may be conducted in a batchwise or continuous manner, and in the batch process the organic sulfoxide, osmium tetroxide and nitric acid are heated to the reaction temperature. As the reaction is exothermic, it continues without the addition of further heat when the reaction temperature is reached, and in certain cases, it may be necessary to cool the reaction mixture in order to avoid degradation of the sulfoxide or distillation of the sulfoxide from the reaction zone. The rate of reaction may be controlled by initially introducing the osmium tetroxide catalyst and a small portion of the sulfoxide into the reactor after which the remaining sulfoxide is gradually added. The reaction products are isolated by distillation or any other convenient method and the products may be characterized by boiling point, melting point, mixed melting point and infrared spectroscopy.

The disproportionation reactions are preferably effected at atmospheric pressure, however, superatomospheric pressures up to 1000 p. s. i. g. may be used if it is desired to retain lower boiling products, or diluents such as water, within the reaction zone at high temperatures or if it is desired to pressure oxygen or oxygen-containing gas into the reaction mixture.

The disproportionation reaction may be operated continuously by heating a small amount of sulfoxide, osmium tetroxide and the oxide of nitrogen compound in a reactor. When the reaction starts, the remaining portion of sulfoxide is added to the reactor slowly and continuously and the temperature in the bottom of the reactor is maintained at the distillation temperature of the sulfoxide. The reaction takes place in an intermediate portion of the reactor and sulfone is continuously bled off from the bottom of the reactor while sulfide is removed from the system by distillation. Oxygen may or may not be added during the reaction.

The following examples are offered as a better understanding of the present invention and are not to be construed as unnecessarily limiting thereto.

EXAMPLE 1

This example illustrates the catalytic disproportionation of dimethyl sulfoxide in the presence of osmium tetroxide and nitric acid.

Dimethyl sulfoxide (20.0 grams), 6 N $HNO_3$ (5.0 grams) and osmium tetroxide (0.02 gram) were mixed in a reactor and heated at a temperature of 110° C. to 120° C. at atmospheric pressure for a period of two hours. The products were then distilled and yielded dimethyl sulfone (19.9 grams, 82.4 percent yield) and dimethyl sulfoxide (2.8 grams, 14.1 percent recovery). Visual comparison of the colors produced by the thiourea-HCl color test before and after reaction indicated little or no loss of osmium tetroxide during reaction. The thiourea-HCl color test used is that described in: J. W. Mellor, "A Comprehensive Treatise on Inorganic and Theoretical Chemistry," vol. XV, p. 698, Longmans, Green & Co., New York (1936).

The following examples presented in Table 1 below show the improved yield of sulfone when employing an oxide of nitrogen compound as compared with the yield of sulfone obtained when the oxide of nitrogen compound has been omitted. In all of the examples included in Table 1, 100 grams of dimethyl sulfoxide was employed.

*Table 1.—Percent yield of dimethyl sulfone based on disproportionation*

| Example | Concentration of $OsO_4$ g. $OsO_4$/g. $(CH_3)_2SO$ | Without Oxide of Nitrogen | | 10 g. of 70% $HNO_3$ | 2 g. of $NO_2$ | 2 g. of $NO$ |
|---|---|---|---|---|---|---|
| | | Aqueous | Non-aqueous | | | |
| 2 | $1 \times 10^{-4}$ | 32.6 | 37.4 | 93.8 | 99.6 | 97.6 |
| 3 | $1 \times 10^{-5}$ | 9.8 | 22.8 | 28.0 | 26.2 | |
| 4 | $1 \times 10^{-6}$ | trace | | 13.5 | 16.3 | |
| 5 | $1 \times 10^{-7}$ | | 4.7 | | 14.5 | |

The disproportionation reactions in the above table were all run at a temperature of 130° C. for a period of 0.5 hour.

The following Examples 6 through 12 illustrate the disproportionation of various sulfoxides in accordance with the process of this invention.

EXAMPLE 6

Into a glass flask was added $1 \times 10^{-3}$ grams of osmium tetroxide, 2 grams of nitrogen dioxide and 100 grams of diethyl sulfoxide. This mixture was heated and held at a temperature of 110° C. for a period of one hour. Distillation of the resulting product gave diethyl sulfone in 95 percent yield.

EXAMPLE 7

Benzyl sulfoxide (20 grams), 6 N nitric acid (20 grams) and osmium tetroxide (0.02 gram) are added to a glass flask and heated to a temperature of about 150° C. for two hours. Distillation of the product mixture yields essentially benzyl sulfone.

EXAMPLE 8

This example illustrates the complete conversion of organic sulfoxide to sulfone by the addition of oxygen to the reaction mixture containing sulfoxide, osmium tetroxide, and nitric acid.

Dimethyl sulfoxide (20.0 grams), 6 N nitric acid (5.0 grams) and osmium tetroxide (0.02 gram) were mixed in an Amico bomb after which the bomb was pressured to 250 p. s. i. g. with oxygen and heated at a temperature of 110° C. for a period of one hour. Distillation of the product mixture yielded dimethyl sulfone (23.6 grams, 97.5 percent yield) and essentially no sulfoxide or sulfide.

EXAMPLE 9

Diethyl sulfoxide is substituted for dimethyl sulfoxide and reacted under the conditions set forth in Example 8. Distillation of the product yields 95 percent diethyl sulfone.

EXAMPLE 10

3,3-bis(ethylsulfoxy) pentane is substituted for dimethyl sulfoxide and reacted under the conditions set forth in Example 8. Distillation of the product yields 80 percent tetronal.

EXAMPLE 11

Diphenyl sulfoxide (100 grams), nitrogen dioxide (10 grams) and osmium tetroxide ($1 \times 10^{-2}$ grams) are added to a glass flask and heated to a temperature of about 120° C. for a period of about two hours. Oxygen is bubbled through the system throughout the reaction. Distillation of the product yields essentially diphenyl sulfone.

EXAMPLE 12

Thioxane sulfoxide (100 grams), nitrogen dioxide (10 grams) and osmium tetroxide ($1 \times 10^{-2}$ grams) are added to a glass flask, heated to a temperature of about 130° C. for a period of about two hours and treated with oxygen which is bubbled into the system throughout the reaction period. After the reaction is complete, the product, about 95 grams of thioxane, is distilled off.

It is to be understood, without departing from the scope of this invention, that any of the other previously described organic sulfoxides, particularly hydrocarbon sulfoxides having between 2 and 50 carbon atoms in the molecule, can be disproportionated in the presence of osmium tetroxide and any of the oxide of nitrogen compounds previously mentioned, with or without the addition of oxygen, to produce the corresponding sulfone in good yields. Some examples of preferred sulfoxides which can be disproportionated under any set of conditions illustrated in the above examples are methyl octyl sulfoxide which is disproportionated to methyl octyl sulfone; methyl phenyl sulfoxide which is disproportionated to methyl phenyl sulfone; methyl ethyl sulfoxide which is disproportionated to methyl ethyl sulfone; methyl butyl sulfoxide which is disproportionated to methyl butyl sulfone; ethyl propyl sulfoxide which is disproportionated to ethyl propyl sulfone; and 2,2-bis(ethylsulfoxy)propane which is disproportionated to sulfonal.

Having thus described our invention we claim:

1. A process which comprises disproportionating and oxidizing an organic sulfoxide in the presence of osmium tetroxide and an inorganic oxide of nitrogen compound to produce a sulfone.

2. The process of claim 1 wherein the oxide of nitrogen compound comprises nitric oxide.

3. The process of claim 1 wherein the oxide of nitrogen compound comprises nitric acid.

4. The process of claim 1 wherein the oxide of nitrogen compound comprises nitrogen dioxide.

5. The process of claim 1 wherein the oxide of nitrogen compound comprises nitrogen trioxide.

6. The process of claim 1 wherein the oxide of nitrogen compound comprises nitrogen pentoxide.

7. A process which comprises disproportionating and oxidizing a hydrocarbon sulfoxide having between 2 and 50 carbon atoms in the presence of osmium tetroxide and an inorganic oxide of nitrogen compound to produce a hydrocarbon sulfone.

8. The process of claim 7 wherein the hydrocarbon sulfoxide comprises dimethyl sulfoxide.

9. The process of claim 7 wherein the hydrocarbon sulfoxide comprises diethyl sulfoxide.

10. The process of claim 7 wherein the hydrocarbon sulfoxide comprises benzyl sulfoxide.

11. The process of claim 7 wherein the hydrocarbon sulfoxide comprises diphenyl sulfoxide.

12. The process of claim 7 wherein the hydrocarbon sulfoxide comprises methyl octyl sulfoxide.

13. The process of claim 7 wherein the reaction is conducted in an aqueous system at a temperature of between about 65° C. and about 180° C.

14. The process of claim 7 wherein the reaction is conducted in a non-aqueous system at a temperature of between about 50° C. and about 120° C.

15. A process which comprises disproportionating and oxidizing a hydrocarbon sulfoxide having between 2 and 50 carbon atoms in the presence of osmium tetroxide, an inorganic oxide of nitrogen compound and oxygen to produce a hydrocarbon sulfone.

16. The process of claim 15 wherein the reaction is conducted in an aqueous system at a temperature of between about 65° C. and about 180° C.

17. The process of claim 15 wherein the reaction is conducted in a non-aqueous system at a temperature of between about 50° C. and about 120° C.

18. A process which comprises disproportionating and oxidizing an organic sulfoxide in the presence of osmium tetroxide and an inorganic oxide of nitrogen compound at a temperature between about 18° C. and about 200° C. to produce a sulfone as a product of the process.

19. A process which comprises disproportionating and oxidizing an organic sulfoxide in the presence of osmium tetroxide, an inorganic oxide of nitrogen compound and oxygen at a temperature of between about 18° C. and about 200° C. to produce a sulfone as a product of the process.

No references cited.

UNITED STATES PATENT OFFICE
Certificate of Correction

Patent No. 2,870,216

January 20, 1959

David P. Sorensen et al.

It is hereby certified that error appears in the printed specification of the above numbered patent requiring correction and that the said Letters Patent should read as corrected below.

Column 3, line 40, for "intermolecular" read —intramolecular—; column 6, line 17, after "thioxane" insert —sulfone—.

Signed and sealed this 28th day of April 1959.

[SEAL]

Attest:
T. B. MORROW,
*Attesting Officer.*

ROBERT C. WATSON,
*Commissioner of Patents.*